United States Patent [19]

Obara et al.

[11] Patent Number: 4,590,353
[45] Date of Patent: May 20, 1986

[54] ELECTRIC DISCHARGE MACHINING POWER SOURCE

[75] Inventors: Haruki Obara, Sagamihara; Shunzo Izumiya, Hachiouji; Yuji Okuyama, Tama; Akihiro Sakurai, Hino, all of Japan

[73] Assignee: Fanuc Ltd, Yamanashi, Japan

[21] Appl. No.: 704,318

[22] PCT Filed: Jun. 19, 1984

[86] PCT No.: PCT/JP84/00321
 § 371 Date: Feb. 8, 1985
 § 102(e) Date: Feb. 8, 1985

[87] PCT Pub. No.: WO85/00128
 PCT Pub. Date: Jan. 17, 1985

[30] Foreign Application Priority Data
 Jun. 20, 1983 [JP] Japan .................. 58-109223

[51] Int. Cl.$^4$ .................................... B23P 1/08
[52] U.S. Cl. .................. 219/69 C; 219/69 P; 219/69 S
[58] Field of Search ........... 219/69 P, 69 C, 69 W, 219/69 S, 69 R

[56] References Cited
U.S. PATENT DOCUMENTS
4,350,863 9/1982 Inoue .................. 219/69 P
4,387,285 6/1983 Obara .................. 219/69 P FOREIGN PATENT DOCUMENTS
0042743 3/1980 Japan .................. 219/69 P Primary Examiner—M. H. Paschall
Attorney, Agent, or Firm—Staas & Halsey

[57] ABSTRACT

In an electric discharge machining power source having a capacitor discharge circuit with a switching element, charging of a capacitor is stopped through an OR gate (G1), a NOR gate (G2) and a preamplifier (A1) in response to an output from a charge voltage detecting circuit (1) for generating the output when a charge voltage across the capacitor exceeds a reference voltage. At the same time, the switching element is turned on through a preamplifier (A2). The switching element is kept on through the OR gate (G1) and the preamplifier (A2) until a discharge current detecting circuit (4) detects the discharge current and stops generating the output. When the capacitor is completely discharged, the switching element is turned off. When a predetermined period of time has elapsed under the control of a monostable multivibrator (3), the capacitor is recharged.

5 Claims, 4 Drawing Figures

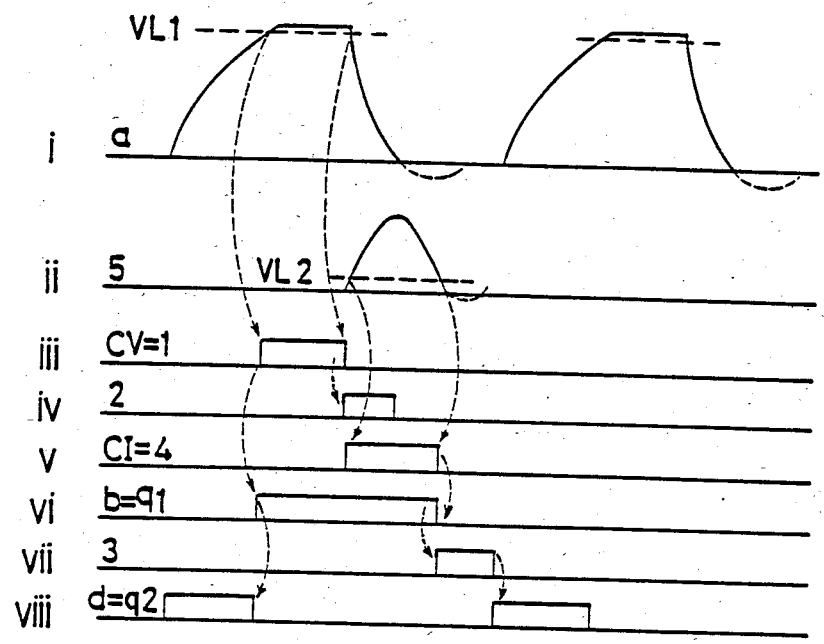

ELECTRIC DISCHARGE MACHINING POWER SOURCE

BACKGROUND OF THE INVENTION

The present invention relates to an electric discharge machining power source for an electric discharge machine for machining a workpiece by using a capacitor discharge.

A conventional discharge circuit of an electric discharge machining power source for performing capacitor discharge is illustrated in FIG. 1. A pulse is supplied to a base q2 of a transistor Q2 as a switching element to repeat the ON/OFF operation of the transistor Q2, and a capacitor C0 is charged by a DC high-voltage source through a resistor R0. A charge voltage is applied between an electrode P and a workpiece W, and the discharge current from the capacitor C0 is generated as a spark between the electrode P and the workpiece W, thereby performing electric discharge machining. In this case, in order to stop discharge between the electrode and the workpiece and perform stable discharge, a transistor Q1 as a switching element is inserted in the discharge circuit, as shown in FIG. 1. When the capacitor C0 is completely charged, the transistor Q2 is turned off, and the transistor Q1 is turned on, thereby starting discharge. In this case, when the switching transistor Q1 is turned off during discharge, the switching transistor Q1 can be damaged by a surge voltage generated by an inductance inherent in the electric discharge machine. The switching transistor Q1 must be turned off after the discharge is completed. However, in the electric discharge machine, the capacitance of the capacitor C0 must vary in order to change a discharge time. The discharge time also changes in accordance with the inductance inherent in the electric discharge machine. For this reason, in order to protect the switching transistor Q1 from damage, it must be turned off within a maximum discharge time in view of the above conditions. However, machining efficiency is degraded by such a method of operation.

SUMMARY OF THE INVENTION

It is an object of the present invention to provide an electric discharge machining power source having a capacitor discharge circuit with a switching element, wherein the conventional drawbacks are prevented, and the switching element is not damaged.

It is another object of the present invention to provide an electric discharge machining power source, wherein a discharge current from the capacitor is detected, and the OFF time of the switching element in the discharge circuit is controlled to protect the switching element from damage caused by a stray inductance.

In order to achieve the above objects of the present invention, there is provided an electric discharge machining power source used for machining a workpiece by capacitor discharge, the electric discharge machining power source having a discharge circuit with a switching element, comprising a charge voltage detecting circuit for detecting a charge voltage of the capacitor and generating an output when the charge voltage exceeds a reference voltage and a discharge current detecting circuit made of a Logoski coil for detecting a discharge current of the capacitor, wherein charging of the capacitor is stopped by an output from the charge voltage detecting circuit, the switching element is turned on, and thereafter the switching element is turned off when discharge is started and the capacitor is completely discharged, and the capacitor is recharged after a predetermined period of time.

When the predetermined period of time has elapsed after the discharge from the capacitor is completed and the switching element is turned off, and when the charge voltage has reached the reference voltage, charging of the capacitor is stopped. The switching element is then turned on, and the discharge current detecting circuit detects the end of discharge. In this state, the switching element is turned off. As a result, the switching element during the electric discharge will not be damaged by the surge voltage. Even if the capacitance of the discharge capacitor changes, or the discharge time changes in accordance with a change in machine inductance, the switching element is turned off after discharging is completed. Therefore, the switching element will not be damaged, and charging is started when the predetermined period of time has elapsed after discharging. In this manner, an idle time can be eliminated to improve the efficiency of electric discharge machining.

BRIEF DESCRIPTION OF DRAWINGS

FIG. 4 is a timing chart for explaining the operation of this embodiment.

DETAILED DESCRIPTION OF THE PREFERRED EMBODIMENT

The present invention will hereinafter be described in detail with reference to FIGS. 2 to 4.

Figure 1:
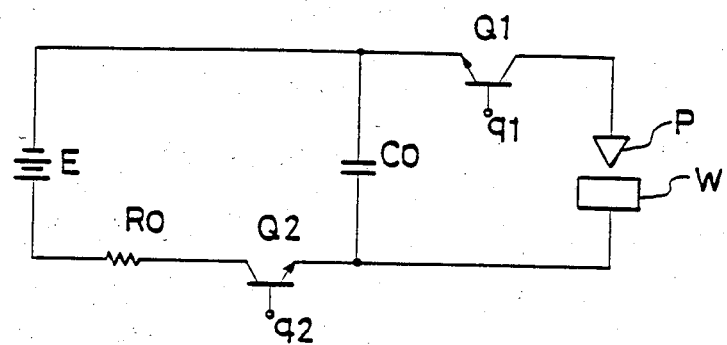
FIG. 1 is a circuit diagram of a conventional electric discharge machining power source.
Figure 2:
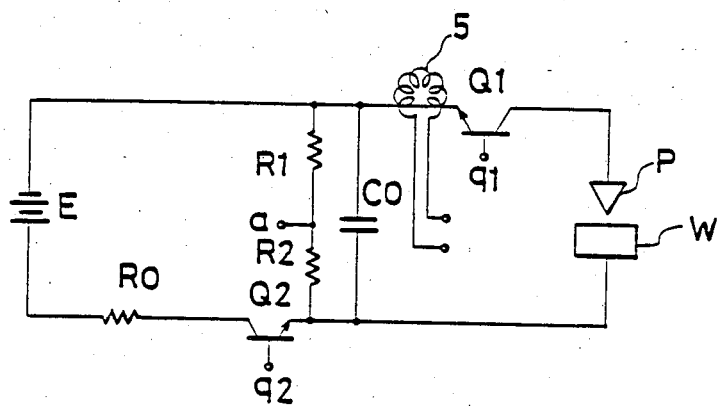
FIG. 2 is a circuit diagram showing the basic circuit arrangement of an electric discharge machining power source circuit according to an embodiment of the present invention.
Figure 3:
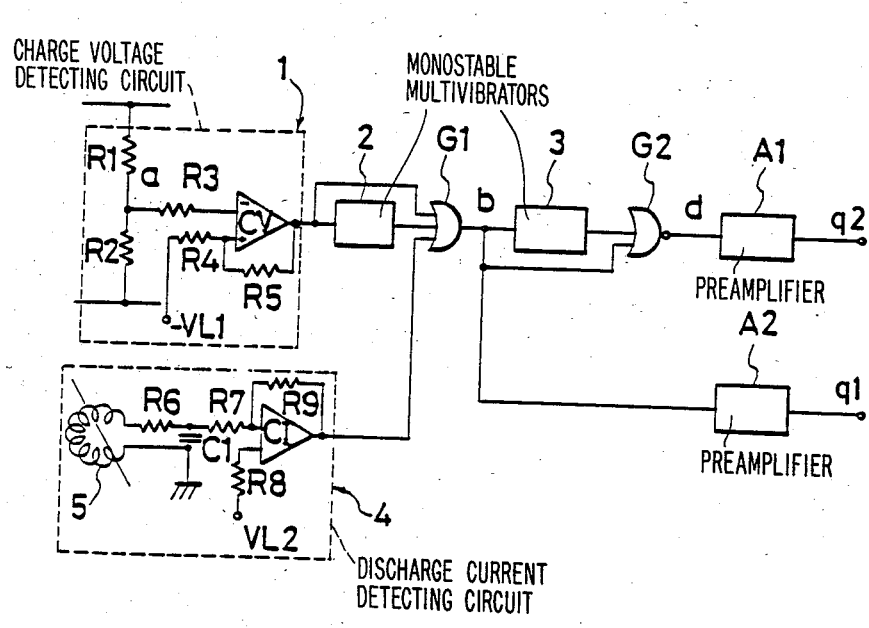
FIG. 3 is a circuit diagram of a control circuit of the power source circuit.

FIGS. 2 and 3 are circuit diagrams of an embodiment according to the present invention. More particularly, FIGS. 2 and 3 are respectively circuit diagrams of an electric discharge machining power source circuit and its control circuit according to an embodiment of the present invention. A current detector 5 such as a Logoski coil is arranged in the conventional electric discharge machining power source in FIG. 1 to detect a discharge current of a capacitor C0. Resistors R1 and R2 are connected in parallel with the capacitor C0. An output a obtained by shunting a charge voltage across the capacitor C0 is extracted by the resistors R1 and R2.

The output a and the output from the current detector 5 are supplied to the control circuit shown in FIG. 3.

Referring to FIG. 3, reference numeral 1 denotes a charge voltage detecting circuit. The charge voltage detecting circuit comprises the resistors R1 and R2 for extracting a shunt voltage a of the charge voltage and a comparator CV for comparing the shunt output a with a reference voltage $-V_{L1}$. An output from the comparator CV is supplied to a monostable multivibrator 2. An output from the monostable multivibrator 2, an output from the comparator CV and an output from a discharge current detecting circuit 4 (to be described later) are supplied to an OR gate G1. An output b from the OR gate G1 is supplied to a base q1 of a transistor Q1 (FIG. 2) through a preamplifier A2. The output b from the OR gate G1 is supplied to a monostable multivibrator 3. An output from the monostable multivibrator 3 and the output b from the OR gate G1 are supplied to a NOR gate G2. An output d from the NOR gate G2 is supplied to a base q2 of a switching transistor Q2 (FIG. 2) through a preamplifier A1. The output from the current detector 5 is integrated by an integrator consisting of a resistor R6 and a capacitor C1. An output from the integrator is supplied to a comparator CI and is compared with a comparison voltage VL2. A resultant output is supplied to the OR gate G1. The current detector 5, the integrator, the comparator CI and so on constitute a discharge current detecting circuit 4.

The operation of the circuit having the arrangement described above will be described with reference to the timing chart of FIG. 4.

FIG. 4i shows a waveform of the shunt output a of the charge voltage of the capacitor C0; FIG. 4ii, a waveform of the output from the current detector 5; FIG. 4iii, a waveform of the output from the comparator CV; FIG. 4iv, a waveform of the output from the monostable multivibrator 2; FIG. 4v, a waveform of the output from the comparator CI; FIG. 4vi, a waveform of the output b from the OR gate G1; FIG. 4vii, a waveform of the output from the monostable multivibrator 3; and FIG. 4viii, a waveform of the output d from the NOR gate G2.

Assume that a pulse is supplied to the base q2 of the transistor Q2 (FIG. 4viii), that the transistor Q2 is turned on to charge the capacitor C0. In this case, the charge voltage is detected by the charge voltage detecting circuit 1. In other words, the shunt output a obtained by shunting the charge voltage by the resistors R1 and R2 is supplied to the comparator CV. As shown in FIG. 4i, the shunt output a is compared with the reference voltage VL1. It should be noted that the reference voltage VL1 is set in accordance with a capacitance of the capacitor C0. When the shunt output a exceeds the reference voltage VL1, the comparator CV generates the output (FIG. 4iii) which is then supplied to the base q1 of the switching transistor Q1 through the OR gate G1 and the preamplifier A2, thereby turning on the switching transistor Q1. On the other hand, the output b from the OR gate G1 is supplied to the NOR gate G2, so that the pulse supplied to the base q2 of the transistor Q2 disappears (FIG. 4viii). The transistor Q2 is thus turned off. When the capacitor C0 is discharged, the current detector 5 in the discharge current detecting circuit 4 detects the discharge current and generates the output signal shown in FIG. 4ii. This output signal is compared by the comparator CI with the comparison voltage VL2. When the output signal from the current detector 5 exceeds the comparison voltage VL2, the comparator CI generates the output shown in FIG. 4v. On the other hand, when the discharge voltage across the capacitor C0 starts to decrease, and the capacitor voltage becomes lower than the reference voltage VL1, the comparator CV stops generating the output (FIG. 4iii). At the trailing edge of the output from the comparator CV, the monostable multivibrator 2 is turned on and generates pulses (FIG. 4iv) having a predetermined pulse width. The pulses from the monostable multivibrator 2 are supplied to the OR gate G1. The monostable multivibrator 2 serves to prolong the duration of the output from the comparator CV. The monostable multivibrator 2 can be omitted when the output (i.e., the output (FIG. 4v) from the comparator CI) of the discharge current detecting circuit 4 does not rise before the output (i.e., the output from the comparator CV) from the charge voltage detecting circuit 1 falls. In this sense, the monostable multivibrator 2 is arranged to keep the output b from the OR gate G1 in the ON state from the leading edge of the output from the charge voltage detecting circuit 1 to the trailing edge of the output from the discharge current detecting circuit 4 so as to compensate variations in the rising and falling times. The OR gate G1 continues to generate the output b. When the discharge current from the capacitor C0 is decreased and the output voltage from the current detector 5 becomes less than the comparison voltage VL2, the output from the comparator CI rises, and the output b from the OR gate G1 falls (FIGS. 4v and 4vi). However, the monostable multivibrator 3 is turned on in response to falling of the output b and generates the pulse having the predetermined pulse width, as shown in FIG. 4vii. The NOR gate G2 will not generate the output d, so the transistor Q2 will not be turned on. When the monostable multivibrator 3 stops generating the pulses, the NOR gate G2 generates the output shown in FIG. 4viii to turn on the transistor Q2 through the preamplifier A1 again, thereby charging the capacitor C0 again. The same operation as described above will be repeated.

We claim:

1. An electric discharge machining power source used for machining a workpiece by discharge of a capacitor, comprising:
    discharge circuit means, with a first switching element, for discharging the capacitor;
    charge circuit means, with a second switching element, for charging the capacitor;
    charge voltage detecting means for detecting a charge voltage of the capacitor and generating a charge output when the charge voltage exceeds a reference voltage;
    discharge current detecting means for detecting completion of discharge of the capacitor and generating a discharge output when a discharge current of the capacitor falls below a predetermined level selected to prevent damage of the first switching element even if the first switching element is turned off when the discharge current is at the predetermined level; and
    switching control means, operatively connected to the charge voltage detecting means and the discharge current detecting means, for turning on the first switching element to initiate discharge of the capacitor, for turning off the second switching element to stop charge of the capacitor through the second switching element in response to the charge output, for turning off the first switching element to stop discharge of capacitor in response to the discharge output, and for turning the second switching element to start charging of the capacitor after an elapse of a predetermined time measured from completion of the discharge of the capacitor as indicated by the discharge output of the discharge current detecting means.

2. A power source according to claim 1, wherein said switching control means includes:
    monostable multivibrator means for providing a pulse output in response to a trailing edge of the charge output;
    logic circuit means for maintaining the first switching element on in response to at least one of the charge output, the pulse output and the discharge output.

3. A power source according to claim 1, wherein the discharge current detecting means comprises:
   a Logoski coil for detecting the discharge current; and
   comparator means for integrating the discharge current detected by the Logoski coil and for generating said discharge output when the integrated signal exceeds a reference signal, the discharge output indicating completion of discharge of the capacitor.

4. A power source according to claim 1, wherein the discharge current detecting means includes a detecting coil electromagnetically coupled to the discharge circuit means, and a capacitor connected across the detecting coil to integrate an output of the detecting coil.

5. A power source according to claim 2, wherein said switching control means includes:
   a second monostable multivibrator means for generating an output during the predetermined time has elapsed, and wherein the second switching element is turned on in response to the extinction of the output from the second monostable multivibrator means.

* * * * *